United States Patent [19]

Horbelt et al.

[11] 4,407,156
[45] Oct. 4, 1983

[54] AIR FLOW RATE MEASURING DEVICE IN AN INTERNAL COMBUSTION ENGINE

[75] Inventors: Michael Horbelt, Schwieberdingen; Herbert Arnold, Eberdingen; Lothar Winkelmann, Ludwigsburg, all of Fed. Rep. of Germany

[73] Assignee: Robert Bosch GmbH, Stuttgart, Fed. Rep. of Germany

[21] Appl. No.: 270,271

[22] Filed: Jun. 3, 1981

[30] Foreign Application Priority Data

Jun. 4, 1980 [DE] Fed. Rep. of Germany ....... 3021117

[51] Int. Cl.³ .............................................. G01M 15/00
[52] U.S. Cl. ..................................... 73/118; 73/861.76
[58] Field of Search .............. 73/118, 861.71, 861.74, 73/861.75, 861.76, 430; 123/472, 478; 324/125

[56] References Cited

U.S. PATENT DOCUMENTS

| | | | |
|---|---|---|---|
| 3,093,794 | 6/1963 | Brooks et al. | 324/125 X |
| 3,354,714 | 11/1967 | Condon et al. | 73/861.74 X |
| 4,040,295 | 8/1977 | Romann | 73/118 |

Primary Examiner—Jerry W. Myracle
Attorney, Agent, or Firm—Edwin E. Greigg

[57] ABSTRACT

An air flow rate measuring device is proposed for an internal combustion engine. The air flow rate measuring device includes a baffle valve disposed in the air intake tube and a signal generating circuit coupled therewith. A damping member is associated with the signal generating circuit. This damping member serves to damp the so-called over-swings in the output signal caused by the sluggishness of the baffle valve and thereby avoid incorrect fuel metering. Two embodiments of damping members are disclosed, both comprising resistor-capacitor combinations together with a diode, in which the stored capacitor charge assumes the function of damping the output signal of the signal generating circuit.

4 Claims, 5 Drawing Figures

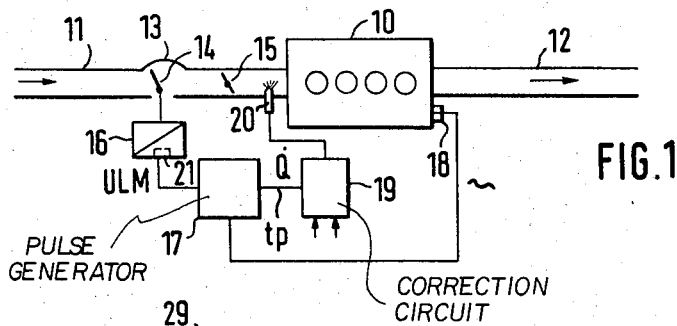
FIG.1
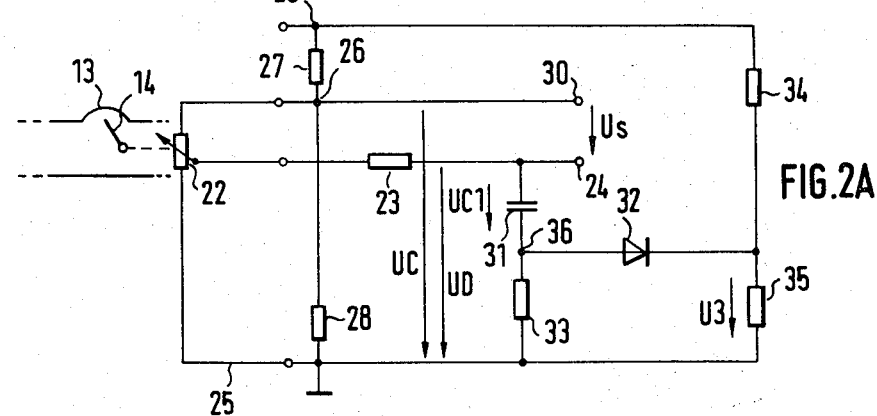
FIG.2A
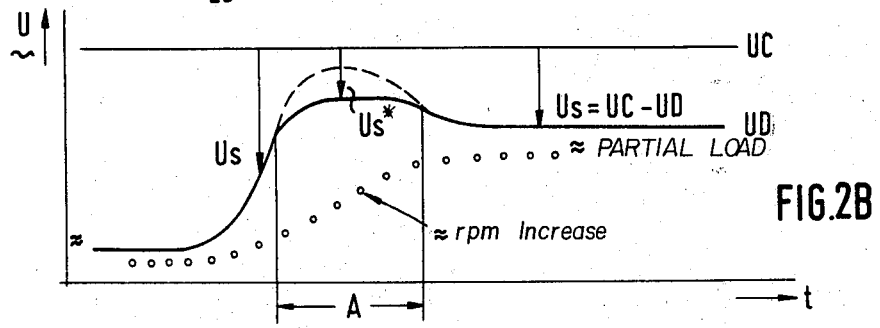
FIG.2B
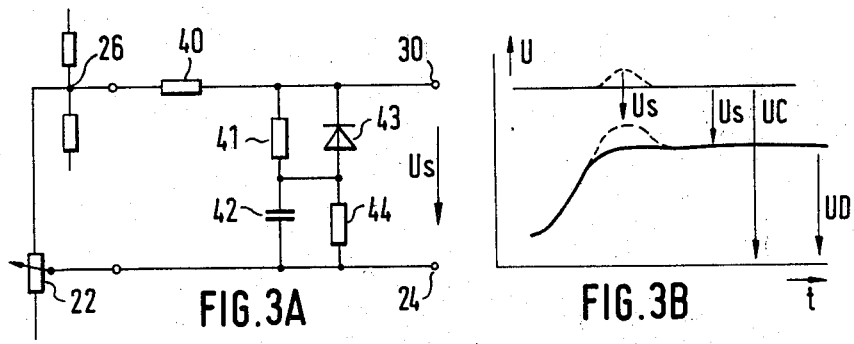
FIG.3A
FIG.3B

AIR FLOW RATE MEASURING DEVICE IN AN INTERNAL COMBUSTION ENGINE

BACKGROUND OF THE INVENTION

The invention is directed to improvements in air flow rate measuring devices provided with a baffle in the intake tube and a signal generating circuit connected therewith. In attaining precise fuel metering, the precise ascertainment of the aspirated quantity of air is of great significance. A known air flow rate meter has a baffle valve supported eccentrically, and the deflection of this baffle valve forms a standard for the mass of air aspirated by the internal combustion engine, in accordance with which the fuel quantity is metered in turn. Baffle valves inherently operate with a certain sluggishness, and the transient effects which occur in the event of abrupt deflections adulterate the measuring signal. In a known fuel injection system, this problem is eliminated by placing limitations on the maximum injection value, so that excessive overswings on the part of the baffle valve do not bring about an excessive fuel metering. However, an abrupt limitation in fuel metering has proven to be disadvantageous in terms of smooth vehicle operation, especially during acceleration.

OBJECTS AND SUMMARY OF THE INVENTION

It is an object of the invention to provide an improved air flow rate measuring device having the advantage over the prior art that relatively gentle transitions can occur between different load states without affecting the speed of reaction.

It is another object to provide an air flow rate measuring device which is simple in structure, extremely reliable, and suited for heavy duty use in a motor vehicle.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is a schematic illustration of an internal combustion engine having fuel injection;

FIG. 2A shows a first exemplary embodiment of the invention;

FIG. 2B shows an associated signal diagram for the first embodiment;

FIG. 3A shows a second exemplary embodiment of the invention; and

FIG. 3B shows an associated pulse diagram for the second embodiment.

DESCRIPTION OF THE PREFERRED EMBODIMENTS

FIG. 1 is a schematic representation of an internal combustion engine together with an injection system. The internal combustion engine itself is designated by reference numeral 10, and it has an air intake tube 11 and an exhaust line 12. An air flow rate measuring device 13, a baffle 14, and a throttle valve 15 are shown disposed one behind the other in the intake tube 11. The shaft of the baffle valve 14 is coupled with a signal generating circuit 16, which emits an output voltage in accordance with the deflection of the baffle valve 14. A subsequent timing element or pulse generator 17 generates a signal wave having the pulse duration tp as an uncorrected injection time, in accordance with the output of the signal generating circuit 16 and in accordance with an rpm meter 18. This signal wave then reaches injection valves 20 in the air intake tube 11 by way of a subsequent correction circuit 19.

On the output side of the signal generating circuit 16, a portion is indicated by reference numeral 21. This portion 21 represents the damping member associated with the signal generating circuit 16. This spatial arrangement is not compulsory, however, because what is essential is only that this damping member be located along the signal processing circuit of the air flow rate signal and that it should become effective before the air flow rate signal is processed in the timing element 17.

FIG. 2A shows a first example of a damping member. The shaft of the baffle valve 14 of the air flow rate measuring device 13 is coupled with the brush of a potentiometer 22, whose middle pickup is carried via a resistor 23 to an output terminal 24. The potentiometer 22 is disposed between a ground line 25 and the junction point 26 of a voltage divider, embodied by two resistors 27 and 28, parallel to the operating voltage connections the positive lead 29 and the ground line 25. The junction point 26 is additionally connected with a connection point 30. The actual damping member is embodied by a capacitor 31, a diode 32 and three resistors 33, 34 and 35. The capacitor 31 and the resistor 33 are disposed in series between the connection point 24 and the ground line 25. Their junction point is coupled via the diode 32 with the junction point of the two resistors 34 and 35 which are disposed between the positive lead 29 and the ground line 25. It must also be understood that the resistor 33 is provided with substantially higher resistance than the two resistors 23 and 35.

Various voltages are indicated in the diagram given in FIG. 2a, as follows: Us, UC1, UD, UC and U3. The same voltage indications Us, UD, and UC are given in the diagram of FIG. 2B. In the latter diagram, a jump in load from idling to partial load is indicated, and the corresponding increase in rpm is indicated by dots. The heavy solid line indicates the voltage UD at the connection point 24, while the broken line shows the corresponding voltage signal without the damping device. It can be seen very clearly that the overswing of the baffle valve is flattened out, thus reducing the effects that such overswing would cause incorrect fuel metering.

In the stationary state, the capacitor 31 is charged up to a voltage which corresponds to that at the brush of the potentiometer 22.

During acceleration this input voltage undergoes a greater increase within a short time than does the voltage established as a result of the relationship between the two resistors 34 and 35. As a result, the diode 32 becomes conductive and the control volage UD at the connection point 24 increases only at a ratio of approximately R35/(R35+R23).

This damping of the voltage at the connection point 24 fades in accordance with a predetermined function, in accordance with the time constant of the Resistor/Capacitor/Diode (RCD) arrangement.

If the signal increase occurs slowly, a steady charge reversal of the capacitor 31 via the resistor 33 occurs, so that the damping becomes ineffective.

With the aid of the circuit layout illustrated in FIG. 2A, a constant maximal voltage variation can be established, independently of the air throughput prevailing at the time of acceleration, in the form of a so-called derivative action via the voltage divider ratio of the resistors 34 and 35.

If a constant voltage which can be effected via the diode 32 is not desired, but if the constant voltage should instead be dependent on the air throughput, then the circuit layout of FIG. 3A is recommended. Identical elements and connection points of the elements of FIGS. 2A and 3A are given identical reference numerals.

Referring to FIG. 3A, a resistor 40 is disposed between the junction point 26 and the connection point 30. Two series circuits comprising the resistor 41 and capacitor 42 as well as the diode 43 and resistor 44 are located between the connection points 30 and 24, with the respective junction points of these four components being connected with one another directly.

In the event of an abrupt load change after higher values, the voltage between the junction point 26 and the brush of the potentiometer 22 is reduced abruptly. This voltage drop is transmitted via the resistor 40, which causes the diode 34 to become conductive, and the capacitor 43 can produce energy as a result. This, in turn, causes a reduced voltage drop US as shown in FIG. 3B.

Depending on the intended use, the circuit layout of FIG. 3A may be more advantageous than that of FIG. 2A, because the respective voltage change in the case of acceleration beginning at a relatively high load state is smaller, and a specialized adaptation accordingly results. Nevertheless, it is quite difficult to determine which of the two circuit layouts indicated would be more effective in an individual case, because specific details would be of critical importance. In any case, it is common to both circuit layouts that errors caused by the sluggishness of the baffle valve in the case of acceleration are avoided, which permits precise fuel metering.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An air flow rate measuring device for an internal combustion engine having an air intake tube, said air intake tube provided with a baffle valve, said baffle valve connected to a signal generating circuit, a damping means associated with said signal generating circuit comprising at least one series circuit provided with a resistor, a capacitor and a junction point therebetween, and said junction point being coupled via a diode having a reference potential.

2. An air flow rate measuring device as defined by claim 1, further characterized in that said reference potential is constant.

3. An air flow rate measuring device as defined by claim 1, further characterized in that said reference potential is provided by an output signal of a pulse generator.

4. An air flow rate measuring device as defined by claim 3, further characterized in that said at least one series circuit comprises two series circuits, one of said series circuits provided with a resistor and a capacitor, the other of said series circuit provided with a diode and a resistor, both of said series circuits being connected via junction points between output connections of said signal generating circuit and being further interconnected at said junction points.

* * * * *